United States Patent [19]
Symmons

[11] 3,788,354
[45] Jan. 29, 1974

[54] SINGLE HANDLE WATER MIXING VALVE

[76] Inventor: Paul C. Symmons, King Ceaser Road, Duxbury, Mass. 02332

[22] Filed: May 30, 1972

[21] Appl. No.: 257,880

[52] U.S. Cl............................ 137/625.4, 137/625.48
[51] Int. Cl............................................ F16k 11/00
[58] Field of Search...... 137/625.4, 625.5, 625.41, 137/625.48, 625.47, 636.3; 251/285, 174

[56] References Cited
UNITED STATES PATENTS

| | | | |
|---|---|---|---|
| 3,476,149 | 11/1969 | Dornaus | 137/625.4 |
| 3,469,818 | 9/1969 | Cowan | 251/174 X |
| 3,543,799 | 12/1970 | Hayman | 251/174 X |
| 3,105,519 | 10/1963 | Fraser | 251/285 X |
| 2,560,841 | 7/1951 | Bishop | 137/625.48 |
| 3,159,181 | 12/1964 | Harke | 137/625.4 |
| 3,526,250 | 9/1970 | Miller | 137/625.4 |
| 3,533,436 | 10/1970 | Parkison | 137/625.4 X |
| 3,580,541 | 5/1971 | Bouhot | 251/174 |
| 3,667,503 | 6/1972 | Farrell et al. | 137/625.4 |

Primary Examiner—Samuel Scott
Attorney, Agent, or Firm—Schiller and Pandiscio

[57] ABSTRACT

The invention is an improvement in water mixing valves and in a preferred embodiment it features ceramic valve members of unique design that are mounted so as to minimize damage by torsional forces or by engagement with other mechanical parts.

32 Claims, 16 Drawing Figures

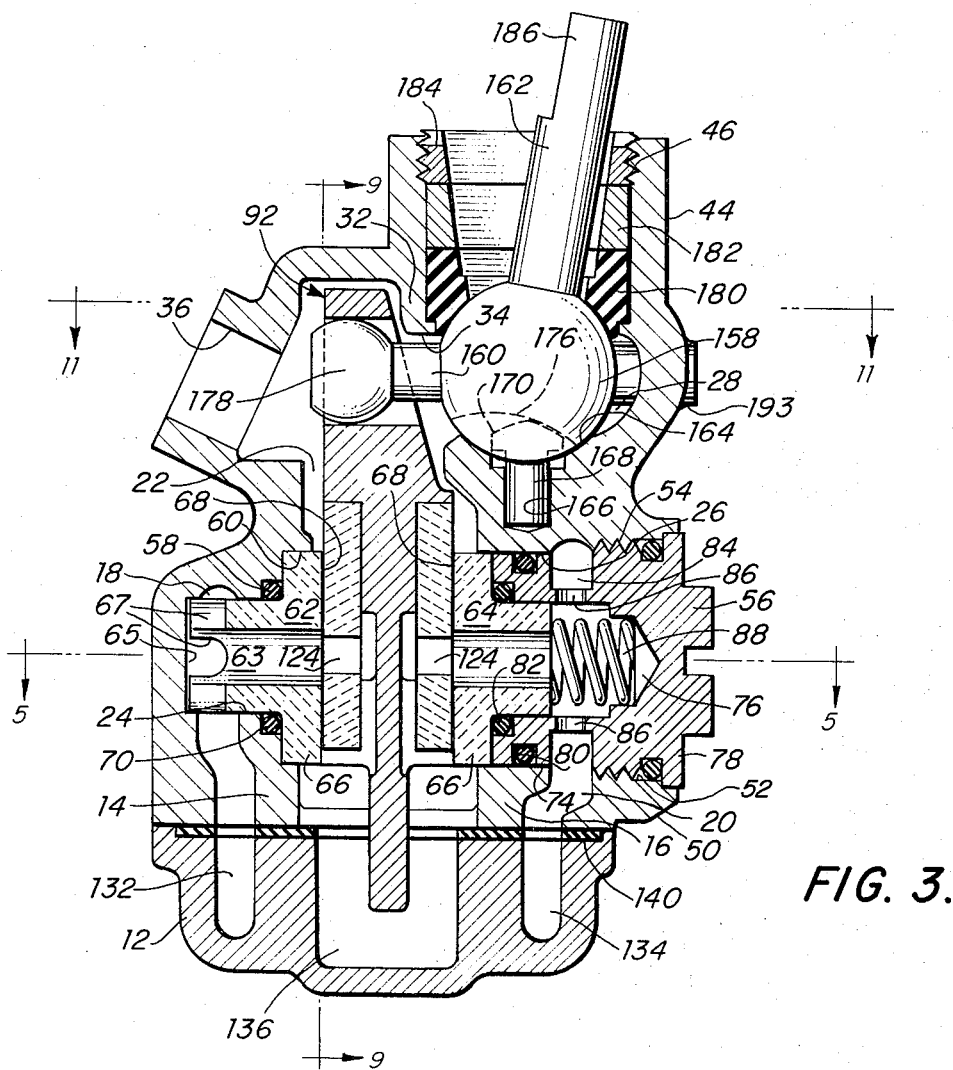
FIG. 3.
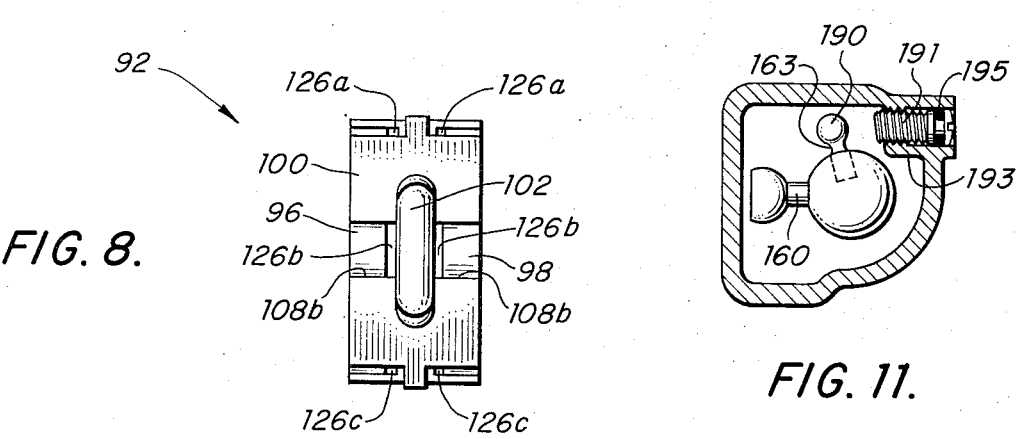
FIG. 8.
FIG. 11.

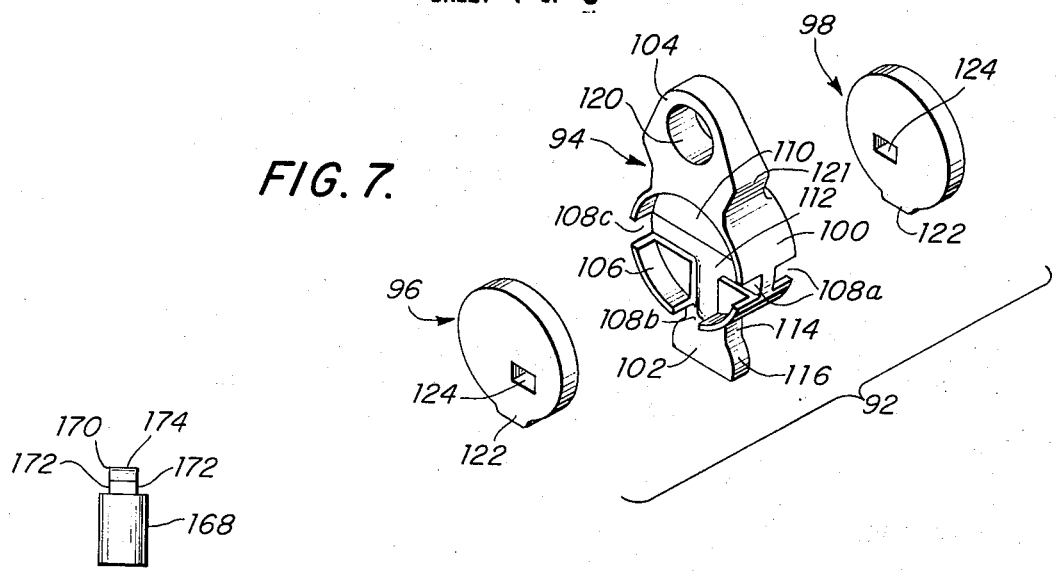
FIG. 7.
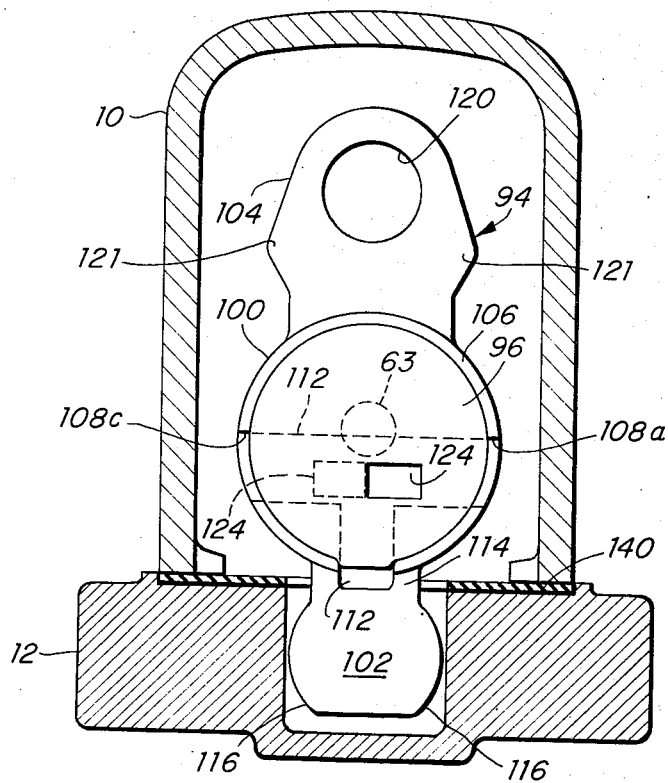
FIG. 10.
FIG. 9A.

SINGLE HANDLE WATER MIXING VALVE

This invention relates to single-handle volume and proportion control valve and more particularly to a mixing valve for combined hot and cold water faucets.

PRIOR ART

Hot and cold water faucets controllable by a single handle or lever are well known. Mixing faucets of this type are arranged so that the handle is capable of two modes of movement, with one mode controlling the volume, i.e. rate of flow, and the other mode controlling the proportions in which hot and cold water are mixed and thus the temperature of the water discharged into the sink or lavatory. Mixing faucets of this type frequently incorporate a mixing valve in the form of a cartridge or unit that is separable from the faucet housing and spout. It also is well known to manufacture mixing faucets in which the valve units comprise ceramic valve members and valve seats.

Mixing valves of the type described are exemplified in U.S. Pat. Nos. 3,324,883, 3,035,612, 3,533,436, 3,433,264, 3,324,884 and 3,384,119. Still other designs of single lever mixing valves are described in the references cited in the foregoing U.S. Patents and also in U.S. Pat. No. 3,476,149.

One problem common to some prior art mixing valves of the character described is the need for excessively large valve units in order to achieve sufficient rate of water flow or sufficient valve member movement to provide close adjustment of total (i.e. mixed water) flow rates. Another common problem is providing an actuating means for the moveable valve member that is so arranged as to permit opposite but substantially equal size incremental changes in the relative rates of flow of hot and cold water, and also so that discharge of mixed water can be stopped without having to move the valve member to a balanced mixture position. A further problem with valves that employ ceramic members as the moving parts is excessive operating noise due to cavitation or other causes. Another problem is a susceptibility of damage of the ceramic members because of torsional forces, impact with associated stop members, binding of one part on another, or ceramic part weakness due to design or arrangement of valve parts. Still other common problems are excessive cost of ceramic parts due to intricate parts design and difficulty in repairing the valve unit.

Accordingly, the primary object of this invention is to provide a new single lever mixing valve that is designed so as to eliminate or substantially reduce many, if not all, of the problems noted above.

Another object is to provide a mixing valve unit that has a minimum amount of structure extending outside of its valve body, is compact yet sufficiently efficient with respect to utilization of space and arrangement of parts as to accommodate a relatively wide range of water flow rates without need for increasing its overall size, and has an adjustable hot water temperature limit stop.

Still another object is to provide a mixing valve that can be combined with either a lavatory or kitchen sink faucet and which can be used with faucet bodies of different decorative structures and sizes.

A further object is to provide a mixing valve that can be disassembled with relative ease for purposes of repair or inspection of parts, utilizes relatively low cost ceramic parts, and is adapted to permit adjustment of the forces that hold the ceramic parts in operative and sealing engagement with each other.

SUMMARY OF THE INVENTION

The foregoing objects are achieved by a mixing valve that in its preferred embodiment essentially comprises two separate ceramic valve seat members and a ceramic valve member that is disposed between and engages the valve seat members. The valve seat members each define a valve opening and are mounted so that, by appropriately positioning the valve member, water can flow from hot and cold water inlet chambers through the valve member to a mixing chamber that has a mixed water discharge port. An adjustable biasing means, which includes a spring, acts on one of the valve seat members to maintain the valve member in tight, water sealing but sliding engagement with the two valve seat members. The valve member is provided with two inlet apertures that are registrable with the openings defined by the valve seat members and communicate with the mixing chamber. Actuating means are provided for moving the valve member according to either or both of two modes of movement so as to cause the two inlet apertures to be moved into greater or lesser alignment with the valve openings, whereby to selectively control the total rate of discharge of mixed water and the relative rates of flow of hot and cold water. Still other features of the invention are set forth in or rendered obvious by the following description of a preferred embodiment of the invention which is to be considered together with the drawings.

THE DRAWINGS

FIG. 3 is a vertical sectional view of the same mixing valve;

FIG. 7 is an exploded perspective view of the valve member;

FIG. 8 is a bottom view of the valve member;

FIG. 9A is a vertical sectional view taken substantially along line 9—9 of FIG. 3;

FIG. 10 is an enlarged elevational view of a particular part of the valve unit;

FIG. 11 is a sectional view on a reduced scale taken along line 11—11 of FIG. 3.

Figure 1:
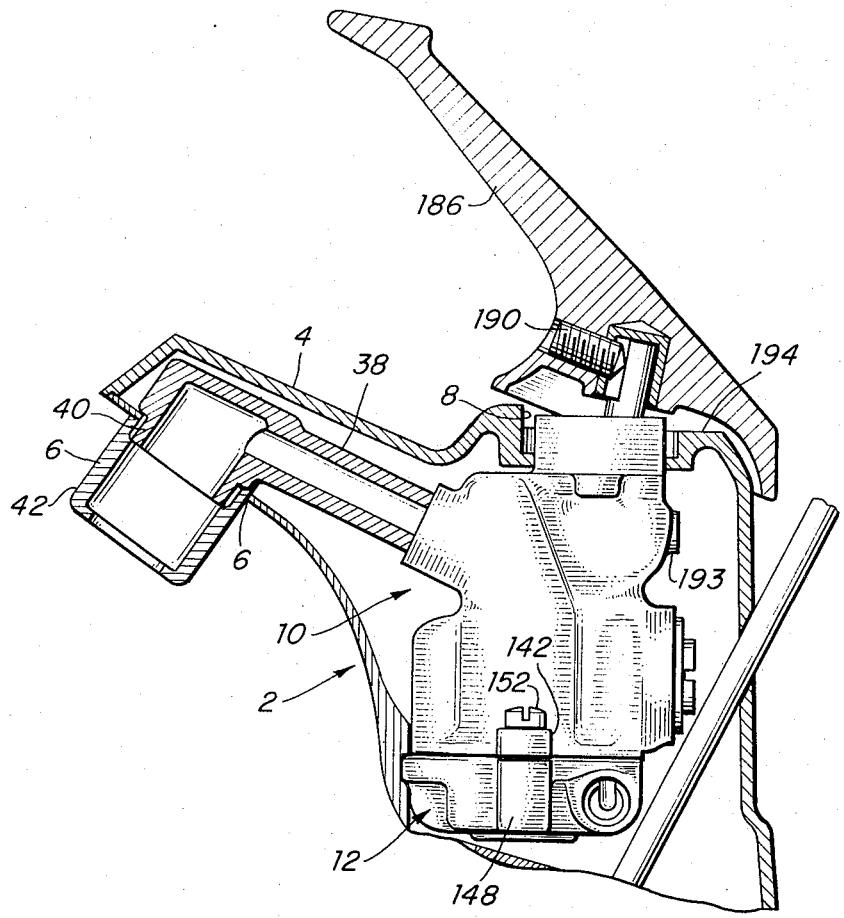
FIG. 1 is a side elevation of a preferred form of a mixing valve constructed in accordance with this invention, the drawing also including a fragmentary sectional view of a lavatory faucet body surrounding and connected to the mixing valve.
Figure 2:
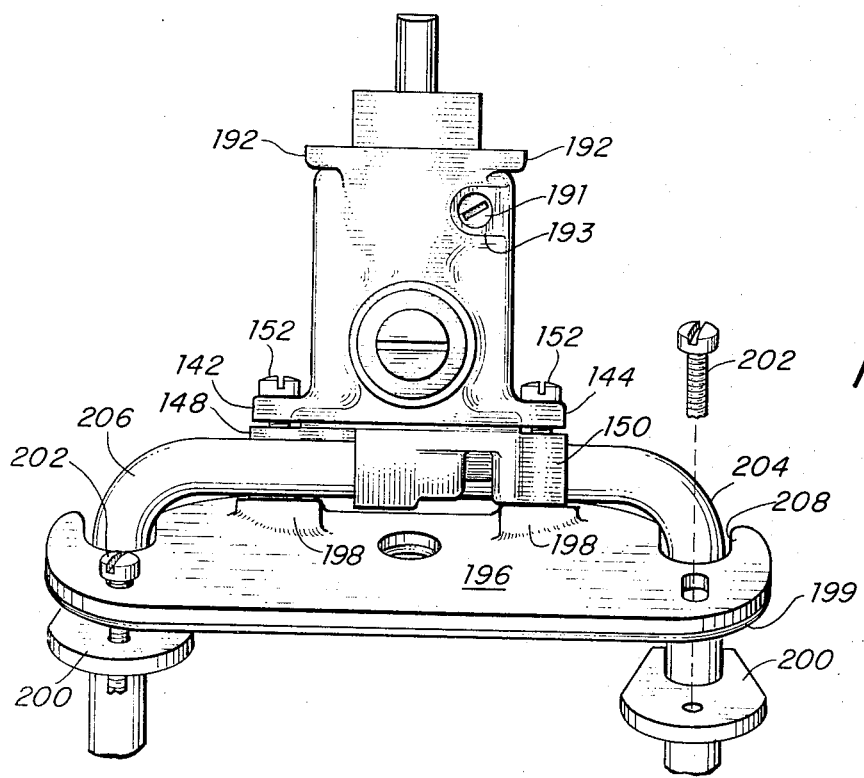
FIG. 2 is a rear elevational view of the mixing valve of FIG. 1.

Turning first to FIGS. 1–3, the illustrated apparatus comprises a lavatory faucet body 2 surrounding a mixing valve unit constructed in accordance with this invention. The faucet body 2 has a spout 4 having a side opening 6. The faucet body also has an opening 8 at its top end to accommodate a top portion of the mixing valve unit.

Figure 6:
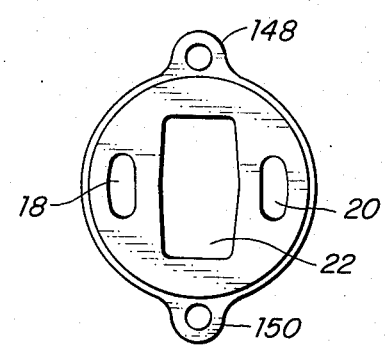
FIG. 6 is a bottom view of the main section of the valve body.

The mixing valve unit comprises a two-piece casing made up of a body 10 and a base 12 which preferably are made of brass. As seen in FIGS. 1–3, 5 and 9, the body 10 is hollow and comprises parallel spaced internal partitions 14 and 16 that subdivide its interior into two relatively small chambers 18 and 20 and a relatively large chamber 22. Openings 24 and 26 in partitions 14 and 16 provide communication between chambers 18 and 20 respectively and chamber 22. The body 10 has a fourth chamber 28 at its top end which is defined in part by a third internal partition 32 that also forms part of the wall structure that defines chamber 22. A relatively large opening 34 in partition 32 provides communication between chambers 22 and 28. As shown in FIGS. 3 and 6, the bottom end of the body 10 is open so as to expose the bottom sections of chambers 18, 20 and 22 to the base 12. The chamber 22 also has an outlet port 36 formed in the outer wall of body 10. A tubular discharge member 38 is mounted in outlet port 36 and extends within the spout 4 of the faucet body. The end of discharge member 38 is formed with an extension 40 that fits within the side opening 6 of spout 4 and is threaded to receive a nozzle member 42 that is adapted to support a conventional screen assembly (not shown) which is designed to cause the water to be discharged as a "soft" stream.

The body 10 also has a cylindrical extension 44 that is internally threaded as shown at 46 and defines a top opening in chamber 28. The exterior wall of valve body 10 also has a lateral extension 50 that is provided with an opening 52 which is axially aligned with the openings 24 and 26 in partitions 14 and 16. Opening 52 is slightly larger in diameter than opening 26. Part of the cylindrical surface defining opening 52 is threaded as shown at 54 to accommodate a threaded plug member 56.

Figure 5:
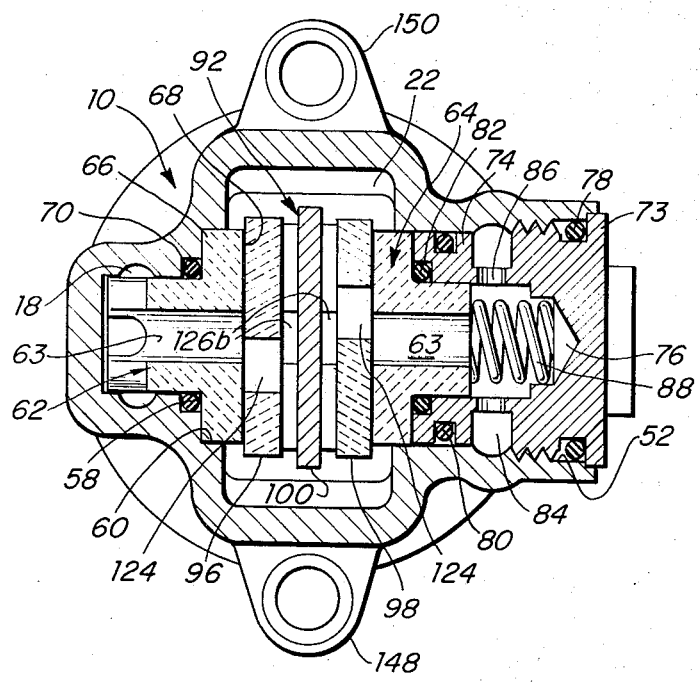
FIG. 5 is a cross-sectional view taken along line 5—5 of FIG. 3.

Turning now to FIGS. 3 and 5, the side of partition 14 facing chamber 22 is double countersunk so as to provide a first smaller diameter groove 58 and a second larger diameter groove 60 which are both concentric with opening 24. The diameter of groove 60 is essentially the same as the diameter of opening 26. Mounted within openings 24 and 26 are valve seating members 62 and 64. In the preferred embodiment of this invention the members 62 and 64 are made of ceramic, e.g. aluminum oxide. Whatever the material of construction, members 62 and 64 are hollow cylinders that define openings 63 and have a circular flange 66 at one end. The opposite end of member 62 fits snugly in a depression 65 in the side wall of body 10 and has a plurality of side openings 67. The outside diameters of the cylinders are just slightly smaller than the diameter of opening 24 while the outside diameters of the flanges 66 are slightly smaller than the diameter of opening 52 and groove 60. The flanged ends of valve seating members 62 and 64 are formed with flat and smooth faces 68. An O-ring 70 surrounds the cylindrical portion of valve seating member 62 and resides in groove 58, while the flange 66 is seated in groove 60.

As seen from FIGS. 3 and 5, the valve seating member 64 is reversed with respect to its counterpart 62 and is engaged by plug 56. The latter is threaded so as to screw into opening 52 and comprises a flange 73 and a cylindrical extension 74. The outside diameter of extension 74 is sized so as to make a close fit with opening 26. Extension 74 is hollow, having a cylindrical axial bore 76 which is sized to snugly accommodate the cylindrical portion of valve seating member 64. Plug 56 has an O-ring 78 seated in a circumferential groove located between its threaded portion and its flange 73. The extension 74 of plug 56 has an O-ring 80 seated in a circumferential groove located adjacent its inner end. A third O-ring 82 is seated in a groove formed in the end face of extension 74. The latter also has a relatively large circumferential groove 84 located between O-ring 80 and the threaded section of the plug. Groove 84 is located so that it can be aligned with chamber 20 when the plug is screwed into the valve body as shown. The cylindrical extension of plug 56 also has a plurality of radial openings 86 in the base of groove 84. It is to be noted that the length of valve seating member 64 is sized so that its cylindrical portion does not overlap any part of any of the radial openings 86. A compression spring 88 is mounted within plug 56 so that one end bears against the end of valve seating member 64 and the other end bears against the end wall of bore 76. O-ring 78 prevents leakage of water out of the valve body via opening 52, while O-rings 80 and 82 prevent leakage of water into chamber 22 between the plug and the surrounding surface of opening 26 and between the end surface of plug extension 74 and valve seating member 64.

Turning now to FIGS. 3, 5, 7, and 9, the valve unit includes a valve member identified generally by the numeral 92. The valve member consists of three parts 94, 96, 98. Part 94 is preferably made of metal while parts 96 and 98 preferably are made of a ceramic material such as aluminum oxide. The main part 94 is elongate and comprises an enlarged center portion 100 having a flat tongue 102 at one end and an arm 104 at the opposite end. The center portion 100 has a circular cavity on each side thereof, each cavity being defined by a circular wall 106 that is slotted at the 3, 6 and 9 o'clock positions as shown at 108A, 108B and 108C respectively and by a flat bottom wall 110 that has a T-shaped groove 112 that is aligned with the slots 108. Each leg of groove 112 is U-shaped in cross-section. The two cavities are aligned with each other. The tongue 102 comprises a short straight portion 114 and an enlarged end portion that has circularly curved side edges 116. The arm 104 is almost as thick as the center portion 100, having one of its faces coplanar with the edge surface of one of the circular walls 106 and the other of its faces disposed at an angle to and offset from the plane of the edge surface of the other circular wall 106. Arm 104 has a round hole 120 for receiving a cooperating part of a valve member operator hereinafter described and its sides are shaped to provide lobes 121.

The two parts 96 and 98 are identical, being formed as flat circular discs with a single radially extending projection 122. Each disc has a single through hole 124 of rectangular or generally rectangular configuration that is located eccentric to its axis of curvature. More specifically one of the short sides of hole 124 extends along the disc's axis of symmetry, i.e. along a center line that passes through the center of the disc and bisects the projection 122 into two equally sized portions. Further the same short side of hole 124 is displaced radially of the disc's center. The discs have a thickness equal to the depth of the cavities in part 94 while their diameters are set so that they will make a friction or press fit with the circular walls 106. Furthermore the projections 122 have a width that allow them to make a snug fit in the slots 108B. The two discs are pressed into the cavities of part 94 so that they lie flat against the bottom surfaces of the cavities and so that their projections 122 are keyed to the slots 108B. However, the two discs are mounted in reverse relation to each other so that their holes 124 are on opposite sides of the axis of symmetry of part 94, i.e. to opposite sides of a center line passing through the center of hole 120 and the center of curvature of circular walls 106. When pressed into place, the outer faces of the two discs are flush with the end edges of walls 106 while their inner faces cooperate with grooves 112 to define T-shaped passageways that can receive water via holes 124 and can discharge water at openings 126A, 126B and 126C provided by slots 108A, B and C respectively (see FIG. 8).

The valve member 92 is mounted within chamber 22 of valve body 10 so that the enlarged center portion 100 of part 94 extends between the two valve seating members 62 and 64 with the tongue 102 extending out of the bottom of chamber 22 and the arm 104 extending up alongside the opening 34 leading to chamber 28. The flat outer surfaces of valve discs 96 and 98 engage the flat confronting end surfaces of valve seating members 62 and 64 respectively. The discs and valve seating members are held in tight sliding engagement with each other by the action of spring 88 whose compression force is adjusted by turning plug 56 so that it moves in or out as required.

Figure 4:
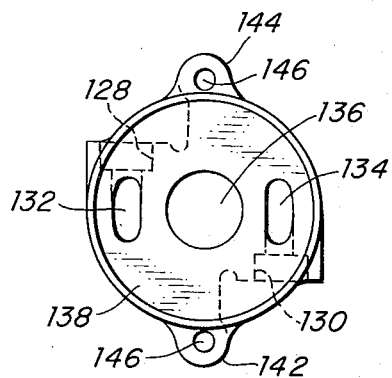
FIG. 4 is a plan view of the base section of the body of the same valve.

Turning now to FIGS. 3–5 and 9, the base 12 serves to close off the bottom ends of chambers 18, 20 and 22. Base 12 is formed with two inlet ports 128 and 130 which communicate with a pair of chambers 132 and 134 respectively that are open at the top as shown in FIG. 4. Formed at the center of base 12 is a cylindrical cavity 136. The upper surface 138 of the base plate is flat and recessed as shown in FIGS. 3 and 9A so as to accommodate a gasket 140 which serves to prevent water from leaking out from between the base and body 10 when the two are secured together. For the latter purpose base 12 is formed with two laterally projecting ears 142 and 144, each having a tapped hole 146, that mate with a pair of ears 148 and 150 (FIGS. 1 and 2) formed integral with valve body 10. Screws 152 secure ears 142 and 144 to ears 148 and 150 respectively.

As seen in FIGS. 3 and 9A, when the base is secured to valve body 10, the chambers 18, 20 and 22 of the valve body are aligned with chambers 132 and 134 and cavity 136 of base 12, with the result that chambers 18 and 132 together form one water inlet chamber connected to inlet port 128 and chambers 20 and 134 form a second water inlet chamber connected to inlet port 130, while chambers 22 and 136 form a mixed water chamber having an outlet 36. Additionally, the cavity 136 serves to receive and guide the flat sided tongue 102 of valve member 92. In this connection it is to be noted that the diameter of cavity 136 is only slightly larger than the maximum width of tongue 102 as seen in FIGS. 9A, B, and C. The clearance between the tongue and cavity is made just sufficient to allow the tongue to move up and down and also to tilt as shown in FIG. 9C. The curved edges 116 cooperate with the cavity 136 to define a horizontal but vertically shiftable titling axis for valve member 92.

Turning now to FIGS. 1–3 and 11, the valve member 92 is moved by a valve operator which comprises a spherical ball 158 and three radially-extending arms 160, 162 and 163. Chamber 28 of valve body 10 is defined in part by a concave surface 164 that acts as a seat for ball 158. Valve body 10 also includes an interior vertical bore 166 that extends perpendicular to the axis of its opening 26 and opens into the concave surface 164. Bore 166 is countersunk as shown and positioned in it is a guide pin 168. The latter has a head 170 which is shaped to function as a key for ball 158. More particularly, head 170 is initially round with a convex upper surface and has a diameter just small enough for it to sit loosely in the countersunk portion of bore 166. Then it is milled away at diametrically opposed points so as to form two flat broad sides 172 (see FIG. 10) and a narrow circularly curved upper surface 174. It is to be noted that in FIG. 3 the pin 168 is displaced 90° from its orientation in FIG. 10, so that in FIG. 3 the flat broad sides 172 are both parallel to the plane of the drawing. The head 170 extends into a narrow slot 176 formed in ball 185, the sides of the slot being equally spaced on opposite sides of a plane of symmetry that includes the center of the ball and the axes of arms 160 and 162. The bottom of slot 176 is circularly curved and it is just wide enough to permit the ball to rotate relative to the head 170 of pin 168 about an axis perpendicular to said plane of symmetry. Also the pin 168 fits loosely in bore 166 so as to permit it and the ball to be rotated on its axis.

The arm 160 extends through opening 34 into chamber 22 and its free end is provided with a rounded head 178. The latter is essentially a spherical ball except that a section has been removed on one side so as to provide a flat face which assures clearance with the adjacent end of the valve body and also to facilitate insertion and removal of the valve operator with respect to the valve body. The rounded head 178 is disposed within the hole 120 of the valve member part 94. The clearance between hole 120 and head 178 is kept small but is sufficient to allow relative rotation of head 178.

The ball 158 is held down on its seating surface 164 by means of a rubber retaining ring 180 that is disposed within the cylindrical extension 44 of the valve body. A metal spacer ring 182 is seated on retaining ring 180 and is held in place by a threaded bushing 184 that is screwed into the threaded section 46 of extension 44. The pressure exerted by retaining ring 80 on the ball is adjusted by turning bushing 184 in or out as desired. It is to be noted that the rubber retaining ring also acts as a washer to prevent leakage of water around ball 158 and into extension 44. The arm 162 extends up through rings 180 and 182 and bushing 184 and projects out of the valve body for attachment of an operating handle 186. One side of the projecting arm 162 is milled flat as shown at 188 to provide a seating surface for a set screw 190 that locks handle 186 in place. Preferably the inner surfaces of rings 180 and 182 and bushing 184 are inclined and cooperate as shown to define an inverted conical aperture which allows the arm 162 to be rocked, i.e. pivoted, in the aforesaid plane of symmetry.

The arm 163 extends at a right angle to the plane of symmetry that includes arms 160 and 162 and its free end has an enlargement 190. Arm 163 forms part of a stop arrangement which also includes a screw 191 mounted in a tapped boss 193 formed in the side wall of body 10. An O-ring 195 on screw 191 prevents water from leaking out between it and the boss.

Attachment of the faucet body to the valve body is facilitated by providing the latter with a pair of ears 192 at opposite sides of its cylindrical extension 44. Ears 192 have tapped holes (not shown) and the upper wall 194 of the faucet body has a pair of aligned holes (also not shown) spaced from opening 8 which receive a pair of screws that are engaged with ears 192 to lock the faucet body to the valve body.

The valve unit is attached to a lavatory sink by means of a plate 196 that has a pair of bosses 198 that have openings to acommodate screws (not shown) that screw into tapped holes formed in the underside of the ears 148 and 150 of base 12. It is to be noted that bosses 198 are tilted with respect to plate 196 so that when the latter and a suitable rubber gasket 199 are clamped flat against the horizontal mounting surface of a sink, the valve unit and the faucet body will be tilted forward over the sink bowl instead of being vertical. Plate 196 is secured to the lavatory sink by a pair of U-shaped clamp members 200 that have clearance holes for receiving bolts 202 that pass through suitable holes in plate 196. It is to be noted that clamp members 200 fit on the underside of the mounting surface of the lavatory sink which is provided with holes to acommodate bolts 202. The latter are held in place by nuts (not shown). Hot and cold water connections to the valve unit are made by attaching supply lines 204 and 206 to the inlet ports 128 and 130 of the base 12. The plate 196 has open slots 208 so as to accommodate vertically extending portions of the water supply lines. The U-shaped clamp members 200 also fit around vertically-extending portions of the water supply lines. As a result of the slotted configurations of plate 196 and clamp members 200, it is possible to clamp the valve unit to the sink after the supply lines have been attached or for the inlet ports of the valve unit to be prefitted at the factory with tubular extensions that can be connected on the underside of a sink to hot and cold water supply lines.

Operation of the valve unit will now be described. For the purposes of this description, let it be understood that the inlet ports 128 and 130 are connected to hot and cold water supply lines respectively and that the valve unit includes operating handle 186. The valve operator can move in accordance with either or both of two different modes. One mode is a back and forth rocking motion with the operator arms 160 and 162 moving in the plane of symmetry mentioned above. In this mode of movement the ball 158 shifts relative to the pin 168. In the second mode of movement, the operator can be rotated about the axis of arm 162. In this case, the ball 158 and the pin 168 both rotate. It is to be noted that the interconnection provided by the head 170 of pin 168 and the slot 176 of ball 158 prevents the operator from pivoting out of the plane of symmetry; rather the plane of symmetry rotates when handle 186 is swung laterally.

When the handle 186 is rocked forward, i.e. so as to shift the arm 162 counterclockwise from the position shown in FIG. 3, the arm 160 acts through its rounded head 178 to force the valve member 92 downwardly relative to the valve seating members 62 and 64. When the arm 162 is rocked rearward (clockwise in FIG. 3), the valve member is moved upwardly between the two valve seating members. When the handle 186 is rotated, i.e. moved laterally, the arm 162 rotates on its axis and this rotational movement causes the rounded head 178 of arm 160 to force the valve member 92 to shift laterally. However, it is to be noted that the tongue portion 102 of the valve member is restrained against lateral movement by the adjacent surface of the cavity 136. Accordingly, the lateral movement of the valve member is a pivotal movement, with the curved edges 116 of the bottom end of the valve member cooperating with the cavity 136 to define a pivot axis.

In FIGS. 9A, B, and C, certain structural features have been omitted so as to facilitate comprehension of how movement of the valve member influences discharge of water by the valve. In these figures the rectangular opening 124 of the disc 196 is shown in full lines and the corresponding opening of the reversely positioned disc 98 is shown in dotted lines. Additionally, the aligned openings defined by the interior surfaces of the valve seating members 62 and 64 are represented by the broken line circle 63.

If the handle 186 is aligned with the faucet spout 4 and is moved forwardly until the arm 162 engages the retaining ring 180, the valve member will assume the position shown in FIG. 9A. In this position, the openings 124 of the two discs are located below and symmetrically positioned with respect to the openings 63. Accordingly, the openings 63 are blocked off by nonperforated portions of discs 96 and 98, with the result that no water can flow from the inlet chambers 18 and 20 to the outlet chamber 22.

Figure 9B:
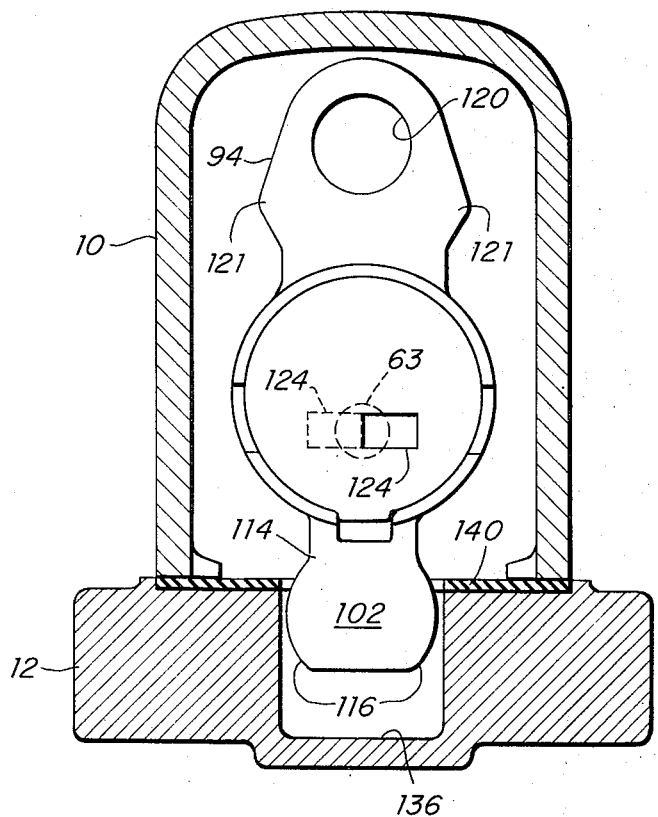
FIG. 9B is like FIG. 9A but shows the valve member in the full ON position.
Figure 9C:
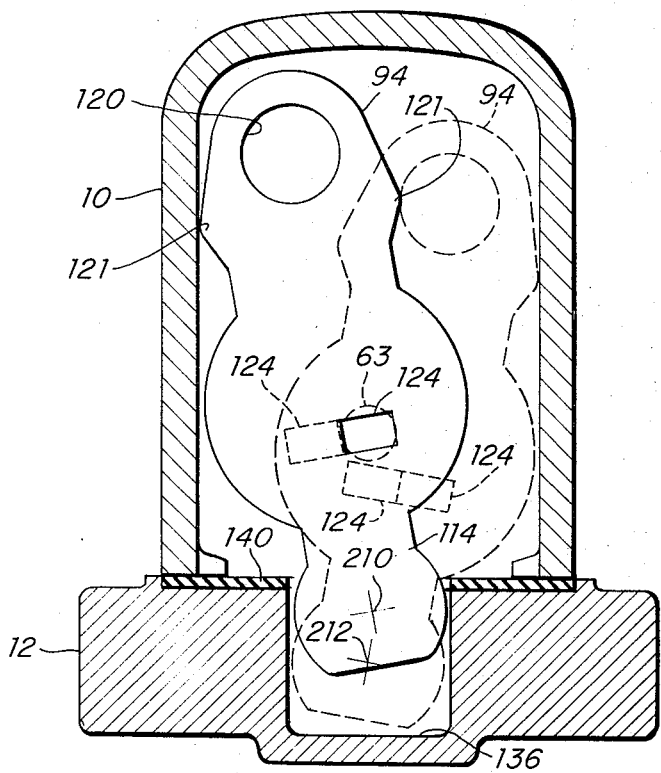
FIG. 9C is like FIGS. 9A and 9B but shows other possible positions of the valve member.

Referring now to FIG. 9B, if the handle 186 is now raised, i.e. moved rearwardly, without at the same time moving it out of alignment with faucet spout 4, the valve member 92 will be raised far enough for the openings 124 to be aligned with the openings 63. However, approximately half of each opening 124 will be aligned with the adjacent opening 63. Consequently, if the hot and cold water pressures are identical, the rate of flow of hot and cold waters from the inlet chambers to the outlet chamber 22 will be approximately the same. In each case water will flow from the inlet chamber (18 or 20) through the opening 63 of the valve seating member and the opening 124 of the adjacent disc (96 or 98), through the grooves 112 and out of the openings 126A, B and C into the outlet chamber 22. This water will pass out of the outlet port 36 through the spout 38 and discharge via nozzle 42.

If with the valve member 92 raised the handle 186 is now rotated to one side or the other of the spout 4, the valve member 92 will pivot as previously described. FIG. 9C shows two different pivot positions for the valve member. The position shown in full lines is that occupied by the valve member when the arm 162 has been moved rearwardly to the position shown in FIG. 3 and the handle 186 has been moved clockwise (as viewed from above). Accordingly, the aperture 124 of disc 96 will be substantially fully in registration with the adjacent opening 63, while the aperture 124 of disc 98 will be fully out of registration with the adjacent opening 63. Hence only hot water will be passed by the valve. As noted earlier, the pivot axis of the valve member 92 shifts vertically according to whether the arm 162 has been moved rearwardly or forwardly. In FIG. 9C the pivot point of the valve member 92 when the handle is in its fully raised position is represented by the intersecting lines 210. If the operating handle has been moved fully forward and is rotated counterclockwise, the valve member will assume the position shown in dotted lines in FIG. 9C. In this position both of the openings 124 will be out of alignment with the adjacent openings 63 and the pivot axis for the valve member is represented by the intersecting lines 212.

Thus when the handle has been moved completely forward, no water can be discharged by the valve, regardless of whether the arm 186 is in or out of alignment with the spout 4. If the handle 186 is raised, water will be discharged by the valve, and the rates of flow of hot and cold water through the valve will be determined by the angular position of the valve member 92. Moving handle 186 to one side or the other while it is out of its fully lowered position will cause water to flow from either one or both of the inlet chambers to the mixing chamber, depending upon the relative degrees of registration of the two openings 124 with the openings 63. It is believed obvious that as the valve member is pivoted, one of the openings 124 will move into greater alignment with the adjacent opening 63 while the other opening 124 will move into a lesser alignment with the other opening 63. Thus the valve makes it possible to provide proportional mixing of hot and cold water as well as controlling the total volume of water which passes into the mixing chamber 22. Unlike other valves previously known, it is not essential for shutting off the valve to bring the operating handle 186 and thus the valve member 92 into vertical alignment with the discharge spout.

It is to be appreciated also that the valve unit is designed to facilitate taking it apart for inspection and repair. The valve body 10, which contains all of the operating members of the valve, can be detached from the base 12 without having to disconnect the latter from the supply pipes. Additionally, all of the discrete components mounted within the valve body 10. can be removed easily. This is accomplished by removing plug 56 and spring 88 so as to expose valve seating member 64. The latter is removed through opening 26. The valve operator is removed through the cylindrical extension 44 after first removing retaining bushing 184 and rings 180 and 182. The flat surface on the end of the rounded head 178 facilitates removal of the valve operator which involves lifting it off of its seating surface 164 and swinging it upwardly so that the rounded head 178 can bass through the opening 34 and will not bind on the surface defining the chamber 28. Once the valve operator is removed, the valve member will drop out of the bottom of the valve body. This frees valve seating member 63 which can be removed through the opening 26.

The invention has still other advantages. For one thing, the valve seating members are simple in design, and thus easy and relatively inexpensive to make and install. Part 94 of valve member 92 need not be made to the same precise tolerances as the valve seating member and can be made of brass or other suitable metal alloy rather than a ceramic. This has the advantage of avoiding any breaking of the valve member due to excessive torsional forces as is a common problem with moveable ceramic valve members. Nevertheless, the valve member has the advantage of ceramic-to-ceramic sealing on both of its hot and cold water sides due to provision of discs 96 and 98. These also are identical parts so that they may be interchanged. Furthermore, because of the simple construction, they are relatively inexpensive to make. Damage to these discs are minimized since they are contained by the surrounding walls 106 of the valve member part 94 and are not subjected to any torsional forces. In a ceramic valve it is a requirement that the mutually engaging surfaces of ceramic parts be as flat as possible in order to provide maximum sealing. This requirement is easily met in the present invention since the engaging faces of the valve seating members 62 and 64 and the discs 96 and 98 are flat and thus can be machined and polished to a smooth planar finish. A further advantage is that the ceramic valve discs 96 and 98 do not encounter directly any stops in moving to the full ON or OFF position. Instead, the limits of movement are determined by engagement of arm 162 with one or more of the elements 180, 182 and 184 when the valve assembly is raised or lowered and by engagement of lobes 121 of valve member 94 with side wall sections of the valve body 10 (or by engagement of enlargement 190 of arm 163 with screw 191) when the arm 162 is rotated to pivot the valve member. As a consequence, likelihood of damage to the valve discs is minimized. The adjustable stop comprising arm 163 and screw 195 is not essential but is preferred. Moving the screw inward limits the extent to which the valve member 94 can be pivoted to increase the flow of hot water. The adjustable stop permits adjusting the maximum flow of hot water through the valve, and thus effectively acts as an adjustable temperature limiting means for the mixed water output of the valve to minimize danger of scalding the user. This safety feature is highly desireable, for example, when the valve is installed on a lavatory used by sick or elderly persons or by young children. A further advantage of the valve is that it exhibits little noise in operation.

In this connection it is to be noted that the openings 67 and 86 are relatively small and thus function as flow-restricting orifices to limit the velocity at which water can flow from the inlet chambers 132 and 134 to the openings 124 of the valve discs 96 and 98. As a consequence water noise is substantially reduced. However, the volume rate of flow through the valve is optimized by virtue of the fact that a plurality of openings 67 and 86 are provided to pass water from the inlet chambers. Still other advantages will be obvious to persons skilled in the art.

Figure 12:
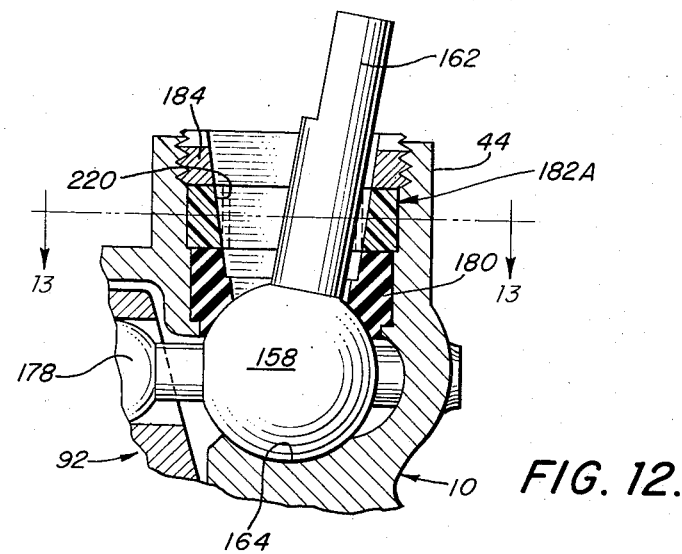
FIGS. 12–14 show other modifications of the invention.
Figure 13:
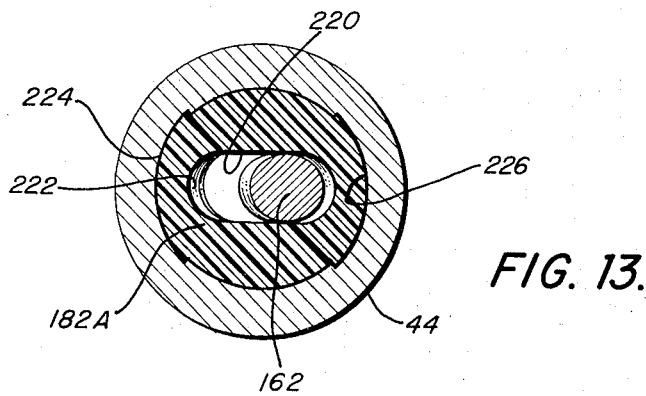
Figure 14:
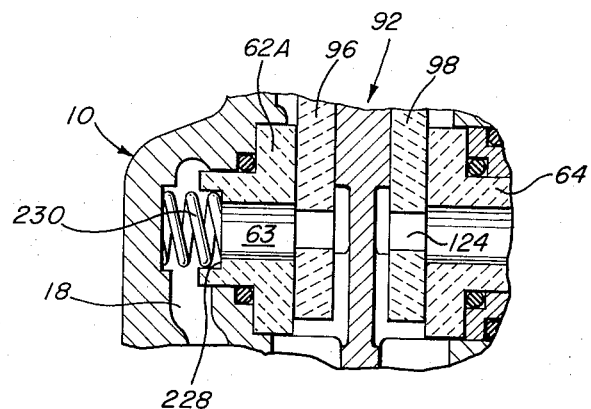

FIGS. 12 and 13 show one modification and FIG. 14 shows still another modification of the invention, both of which are characterized by the advantages noted above and also by other advantages that are rendered obvious hereinafter.

FIG. 12 is a fragmentary sectional view in elevation of the upper end of the valve body with a modified means for supporting and limiting movement of the valve operator and FIG. 13 is a cross-sectional view taken along line 13—13 of FIG. 12. It is to be noted that in FIGS. 12–14 the same numbers are used to designate parts corresponding to those shown in FIGS. 1–11.

Referring now to FIGS. 12 and 13, the metal spacer ring 182 is replaced by a ring 182A which may be made of metal but preferably is made of a rigid plastic material. The interior surface of ring 182A is shaped to define an elongated hole 220 that is tapered vertically as shown in FIG. 2. Hole 220 is just wide enough (the vertical dimension in FIG. 13) to slidably accommodate the rod 162 of the valve operator and has circular end surfaces 222 with a curvature of the same radius as rod 162. Ring 182A is formed with tongues or keys 224 at diametrically opposed sections as shown in FIG. 13 so as to fit in slots or keyways 226 that are formed in the inner surface of the extension 44 of valve casing 10. The tongues and slots cooperate to lock the ring 182A to the casing so that the long dimension of opening 222 is aligned with the valve seating members 62 and 64. In contrast to the embodiment previously described (see FIG. 3) the ball 158 of the valve operator is devoid of the slot 176 and the guide pin 168 is omitted in this modification. However, ball 158 is still slidably seated on the concave surface 164 of casing 10. This above-described construction serves to directly provide limit stops for forward and backward movement of operator arm 162 and also limits said arm to movement (translatory and rotational) in a vertical plane that includes the opening 220 and the valve seating members 62 and 64.

The modification of FIG. 14 is directed to the valve seating member 62. In this case a modified valve seating member 62A is used which is shorter in length than the member 62 and does not have the latter's side openings 67. Instead its outer end is counterbored as shown to provide a shoulder 228 which acts as a seat for one end of a compression spring 230. The opposite end of spring 230 is seated in a cavity formed in the adjacent inner surface of valve body 10. Spring 230 serves two functions. One is to urge the valve seating member toward the valve member 92. The other function is to restrict water flow from the inlet chamber 132 to the opening 124 of valve disc 96 via opening 63 of valve seating member 62A so as to reduce water noise.

It is contemplated also that the valve may be modified in other ways without departing from the scope of this invention. Thus it is possible for the valve member 92 to be made of a single ceramic part. Alternatively, the valve member 94 may be made of metal and the discs 96 and 98 may be combined as a single part having separate passageways for apertures on both sides corresponding to the apertures 124. This unified disc-like part may then be installed in a circular opening formed in the valve member 94. Still other modifications of the invention will be obvious to persons skilled in the art.

What is claimed is:

1. A mixing valve comprising in combination:
   a hollow valve body having first and second inlet chambers, a liquid mixing chamber, first and second inlet ports and an outlet port communicating with said first and second inlet chambers and said mixing chamber respectively, and first and second passageways connecting said mixing chamber and said first and second inlet chambers;
   first and second ceramic valve seats mounted in said first and second passageways respectively, said valve seats each defining a valve opening and each having a flat face exposed to said mixing chamber;
   a valve member in said mixing chamber, said valve member having first and second flat ceramic faces engaging the flat faces of said first and second valve seats respectively, said valve member also having an aperture in each of its flat ceramic faces and at least two separate discharge openings each leading from one of said apertures to said mixing chamber;
   means in said body acting on said valve member so that said valve member can pivot in a plane extending parallel to said flat faces and can shift its pivot on a straight line axis that is perpendicular to the axes of said valve openings;
   a valve member operator;
   means providing a swivel connection between one portion of said valve member operator and said valve member; and
   means mounting said valve member operator so that said valve member operator can selectively cause said valve member to shift said pivot axis and also to pivot on said pivot axis;
   said apertures being disposed so that by pivoting and shifting said valve member said apertures can be progressively moved into and out of alignment with said valve openings so as to vary the relative volume flow of liquid from each of said inlet ports to said mixing chamber.

2. A valve structure comprising:
   a valve body having means defining a chamber;
   a pair of valve seats each having means defining a valve opening to said chamber, said valve seats being disposed in opposed spaced relation to each other;
   a valve plate disposed between and engaging said valve seats, said valve plate being disposed for lateral and arcuate movement in a first plane that is fixed with respect to a first axis that is perpendicular to said valve seats, said valve plate having flow control means cooperable with said valve openings for determining the relative effective openings of said valve openings and the combined volume of flow through said valve openings to said chamber in accordance with movement of said plate in said first plane;
   a movable operator for moving said valve plate, said operator including an arm;
   guide means for guiding said operator so that said arm is confined for movement in a second plane that (1) is fixed with respect to said operator and (2) is moveable with respect to said valve body; and
   a connection between said arm and said valve plate for transmitting force from said arm to said valve plate so as to cause said plate to undergo lateral and arcuate movement in said first plane in response to movement of said operator.

3. A valve structure according to claim 2 wherein said valve seats are separate elements.

4. A valve structure according to claim 2 further including means determining a moveable pivot axis for said valve plate that extends perpendicular to said first plane.

5. A valve structure according to claim 2 wherein said valve seats are made of a ceramic material and said valve plate has ceramic faces that engage said valve seats.

6. A valve structure according to claim 2 wherein said operator includes a second arm that is fixed with respect to said operator and is located in said second plane, said body having an opening in which said second arm is moveable, and a handle connected to said second arm for moving said operator so as to cause said first-mentioned arm to move said valve plate.

7. A valve structure according to claim 2 wherein said mutually cooperating means comprise a second arm on and fixed with respect to said operator, and means carried by said body for guiding said second arm so that said second arm can (a) rotate on its own longitudinal axis and (b) pivot in a plane that intersects said first plane at substantially a right angle.

8. A valve structure according to claim 2 including first and second valve seating members each comprising one of said valve seats, said valve seating members being removably mounted in said body, and compression spring means for urging at least one of said valve seating members into seating relation with said valve plate.

9. A valve structure according to claim 2 wherein said guide means is carried by said body.

10. A valve structure according to claim 2 wherein said operator comprises a ball rotatably coupled to said valve body, and said arm extends radially of said ball.

11. A valve structure according to claim 2 wherein said guide means comprises mutually cooperating means carried by said valve body and said operator, said mutually cooperating means comprising a pin rotatably mounted to said body and extending along a second axis that is fixed with respect to said body, and a ball forming part of said operator that is slidably connected to said pin so that said ball is confined to rotation on said second axis and a third axis that is perpendicular to said second plane.

12. A valve structure according to claim 11 wherein said arm extends radially of said ball and extends at a right angle to said third axis.

13. A valve structure according to claim 2 wherein said valve seats are made of ceramic material and said valve plate has removeable ceramic valve sections that engage said valve seats.

14. A valve structure according to claim 13 wherein said valve sections are discs each having an aperture that is cooperable with the valve opening of one of said seats to determine the relative effective opening of said one valve opening, and further wherein said valve plate has passageways connecting with said apertures to pass fluid to said chamber.

15. A valve structure according to claim 2 wherein said valve seats are separate elements removeably mounted to said body.

16. A valve structure according to claim 15 further including adjustable means for holding said valve seats and said valve plate in engagement with each other under a pressure sufficient to prevent leakage of fluid along the interfaces of said valve seats and valve plate and insufficient to prevent sliding movement of said valve plate relative to said seats.

17. A valve structure comprising:
a valve casing having means defining a pair of inlet ports and a chamber;
a pair of valve seating members each having means defining a valve opening leading from one of said inlet ports to said chamber, said valve seating members being spaced from one another and disposed at opposite sides of said chamber;
a valve member slidably disposed between and engaging said valve seating members, said valve member being mounted for lateral and arcuate movement relative to said valve openings and having flow control means cooperable with said valve openings for varying the relative and combined volumes of flow of fluid through said valve openings;
an operator for moving said valve member, said operator including a ball and first and second arms extending radially of said ball;
mutually engaging parts on said ball and said valve casing for guiding said operator so that said operator is confined to movement in a first plane that includes both of said arms and said ball, and said operator and said first plane are rotatable with respect to said valve body;
a connection between said first arm and said valve member for transmitting force from said operator to said valve member so as to cause said valve member to undergo said lateral and arcuate movement in response to movement of said operator in said first plane and rotation of said operator on said axis;
said second arm being accessible through an opening in said valve casing for effecting movement of said operator.

18. A valve structure according to claim 17 wherein said valve seating members have ceramic faces and said valve member has ceramic surfaces, said faces and said surfaces engaging each other under a pressure sufficient to prevent leakage of fluid along their interfaces and insufficient to prevent relative sliding movement of said valve member.

19. A valve structure according to claim 17 wherein said valve seating members are made of a ceramic composition.

20. A valve structure according to claim 17 wherein said valve member includes apertures on opposite sides thereof that are cooperable with said valve seating members to determine the relative effective sizes of said valve openings, said apertures being disposed so that on arcuate movement of said valve member the relative effective size of one of said valve openings will increase and the relative effective size of the other valve opening will decrease, said valve member also having passageways connecting said apertures with said chamber for passing fluid from said valve openings to said chamber via said apertures.

21. A valve structure according to claim 20 wherein said apertures are disposed so that by movement of said operator in said plane the effective sizes of said valve openings can be increased simultaneously or decreased simultaneously according to the direction of movement of said operator in said plane.

22. A valve structure according to claim 17 wherein said valve casing comprises a valve body and a base attached to and closing off one end of said valve body, said valve seating members and said operator being disposed in said valve body and said valve member being partly in said valve body and partly in said base;
and further wherein said vase and one end of said valve member have cooperating means that determine a shiftable pivot axis for said valve member that confines said valve member to said lateral and arcuate movement.

23. A valve structure according to claim 22 wherein said connection is between said first arm and the opposite end of said valve member.

24. A valve structure according to claim 17 wherein one of said valve seating members is mounted in an opening in a wall of said valve casing.

25. A valve structure according to claim 24 wherein said valve casing has an opening, a plug member disposed in and closing off said valve casing opening, said plug member having a hollow extension, and the other of said valve seating members being mounted to and supported by said hollow extension.

26. A valve structure according to claim 25 further including spring means interposed between said plug member and said other valve seating member for urging said other valve seating member into engagement with said valve member.

27. In a water mixing valve having an outlet chamber, a pair of inlet chambers, a pair of opposed valve openings each communicating with one of said inlet chambers and said outlet chamber, and a flat valve seat associated with each of said valve openings, a valve member disposed between and engaging said valve seats, said valve member being mounted for two direction translational movement in a plane extending parallel to said valve seats and having flow control means cooperable with said valve openings for varying the relative and combined volumes of flow of fluid through said valve openings to said outlet chamber, said flow control means comprising a pair of flat surfaces on opposite sides of said valve member slidably engaging said valve seats, an aperture in each of said flat surfaces disposed so as to be moveable into and out of registration with one of said valve openings, and separate passageways providing communication between said apertures and said outlet chamber, said apertures being displaced to opposite sides of an axis fixed with respect to said valve member so that when one aperture is in maximum registration with one valve opening the other aperture is in minimum registration with the other valve opening.

28. Apparatus according to claim 27 further including a first flow-restricting orifice means between one of said valve openings and one of said inlet chambers, a second flow-restricting orifice means between the other of said valve openings and the other of said inlet chambers, said first and second orifice means each comprising a plurality of spaced apertures.

29. A mixing valve comprising in combination: a hollow valve body having first and second inlet chambers and a mixing chamber, first and second inlet ports communicating with said first and second inlet chambers respectively, an outlet port communicating with said mixing chamber, and first and second mutually opposed and aligned valve openings connecting said first and second inlet chambers respectively to said mixing chamber;

first and second spaced valve seats at said first and second valve openings respectively;

a valve member disposed between said valve seats, said valve member having first and second surfaces engaging said first and second valve seats respectively, said valve member having first and second apertures in said first and second surfaces respectively and separate discharge openings each leading from one of said apertures to said mixing chamber, said valve member being moveable so that said first and second apertures can be moved into and out of alignment with said valve openings whereby to permit or prevent flow of liquid from said inlet chambers to said mixing chamber via said valve openings and said valve member apertures and discharge openings;

a valve member operator;

means providing a swivel connection between said valve member operator and said valve member; and means mounting said valve member operator so that said valve member operator can be operated to selectively pivot and shift said valve member and thereby move said apertures into and out of alignment with said valve openings.

30. A mixing valve according to claim 29 wherein said apertures are partially aligned with each other so that when one of said apertures is substantially fully aligned with one of said valve openings the other aperture is substantially fully out of alignment with the other of said valve openings.

31. Apparatus according to claim 29 further including adjustable stop means for limiting movememt of said valve member in the direction in which said valve member must be moved to increase the degree of alignment of said first aperture with one of said valve openings.

32. Apparatus according to claim 31 wherein said adjustable stops means is disposed so as to coact with said valve member operator to limit movement of said valve member.

* * * * *